US012589781B2

(12) United States Patent
Liktor

(10) Patent No.: US 12,589,781 B2
(45) Date of Patent: Mar. 31, 2026

(54) TREAD BRAKE ASSEMBLY

(71) Applicant: KNORR-BREMSE SYSTEME FÜR SCHIENENFAHRZEUGE GMBH, Munich (DE)

(72) Inventor: Balazs Liktor, Budapest (HU)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 466 days.

(21) Appl. No.: 18/266,341

(22) PCT Filed: Nov. 11, 2021

(86) PCT No.: PCT/EP2021/081430
§ 371 (c)(1),
(2) Date: Jun. 9, 2023

(87) PCT Pub. No.: WO2022/122299
PCT Pub. Date: Jun. 16, 2022

(65) Prior Publication Data
US 2024/0043050 A1 Feb. 8, 2024

(30) Foreign Application Priority Data
Dec. 9, 2020 (EP) ..................................... 20212793

(51) Int. Cl.
*B60T 17/22* (2006.01)
*B61H 1/00* (2006.01)
(Continued)

(52) U.S. Cl.
CPC .............. *B61H 1/00* (2013.01); *B60T 17/228* (2013.01); *B61H 13/22* (2013.01);
(Continued)

(58) Field of Classification Search
CPC ...... F16D 65/28; F16D 66/025; F16D 66/026; F16D 49/16; F16D 2125/68;
(Continued)

(56) References Cited

U.S. PATENT DOCUMENTS

| 4,546,298 | A | | 10/1985 | Wickham et al. | |
| 5,701,975 | A | * | 12/1997 | Hawryszkow | ......... B61H 13/24 188/153 R |
| 6,176,354 | B1 | * | 1/2001 | Sauter | .................... B61H 13/24 188/220.1 |

(Continued)

FOREIGN PATENT DOCUMENTS

| CN | 106926838 A | 7/2017 |
| EP | 3587204 A1 | 1/2020 |
| WO | 2019202032 A1 | 10/2019 |

OTHER PUBLICATIONS

International Search Report and Written Opinion corresponding to PCT/EP2021/081430 dated Feb. 23, 2022.

*Primary Examiner* — Robert A. Siconolfi
*Assistant Examiner* — San M Aung
(74) *Attorney, Agent, or Firm* — Barnes & Thornburg LLP

(57) ABSTRACT

A tread brake assembly for a rail car includes at least one brake block for pressing against a tread of a corresponding rail car wheel, a piston actuator powered by a fluid for driving the tread brake assembly, a brake rigging for transferring a braking stroke from the actuator piston to the at least one brake block, at least one sensor device for measuring at least one parameter of the tread brake assembly, and the tread brake assembly further includes a stroke detector having an active state in which the stroke detector activates the sensor device, wherein the stroke detector is configured to enter its active state upon detecting a force, stress, strain or motion of the brake block, the brake rigging and/or the actuator.

15 Claims, 2 Drawing Sheets

(51) Int. Cl.

| | |
|---|---|
| *B61H 13/22* | (2006.01) |
| *B61H 15/00* | (2006.01) |
| *F16D 66/00* | (2006.01) |
| *F16D 66/02* | (2006.01) |

(52) U.S. Cl.
CPC ....... *B61H 15/0092* (2013.01); *F16D 66/026* (2013.01); *F16D 2066/003* (2013.01); *F16D 2066/005* (2013.01)

(58) Field of Classification Search
CPC ............. F16D 2121/04; F16D 2121/14; F16D 2066/003; F16D 2066/005; B60T 1/04; B60T 11/06; B60T 17/228; B61H 1/00; B61H 13/22; B61H 15/0092
USPC ...................................................... 188/1.11 L
See application file for complete search history.

(56) References Cited

U.S. PATENT DOCUMENTS

| | | | | |
|---|---|---|---|---|
| 6,332,515 | B1 * | 12/2001 | Sauter .................... | B61H 13/24 |
| | | | | 188/207 |
| 2003/0024774 | A1 * | 2/2003 | Huber, Jr. .............. | B61H 15/00 |
| | | | | 188/33 |
| 2005/0034933 | A1 * | 2/2005 | Moriarity ............... | B61H 13/04 |
| | | | | 188/33 |
| 2007/0152107 | A1 | 7/2007 | LeFebvre et al. | |
| 2011/0048875 | A1 * | 3/2011 | Murtazin ............... | B61H 13/24 |
| | | | | 188/153 R |
| 2011/0108376 | A1 * | 5/2011 | Call ........................ | F16D 65/52 |
| | | | | 116/200 |
| 2016/0075320 | A1 * | 3/2016 | Finch, Jr. ............... | F16D 66/00 |
| | | | | 188/153 R |
| 2016/0107631 | A1 | 4/2016 | Wallace et al. | |
| 2021/0114578 | A1 * | 4/2021 | Ronse .................... | B60T 17/228 |

* cited by examiner

TREAD BRAKE ASSEMBLY

CROSS REFERENCE AND PRIORITY CLAIM

This patent application is a U.S. National Phase of International Patent Application No. PCT/EP2021/081430 filed Nov. 11, 2021, which claims priority to European Patent Application No. 20212793.2, the disclosure of which being incorporated herein by reference in their entireties.

FIELD

Disclosed embodiments relate to a tread brake assembly for a rail car, in particular, an unpowered rail car, such as a tank wagon or cargo wagon.

BACKGROUND

Conventional rail car tread brake systems include a plurality of brake blocks, a mechanical rigging coupled with the brake blocks for pressing the brake blocks against the rail car's wheels when the rigging is shifted to a braking position, and a pneumatically-operated brake cylinder that, when actuated, shifts the mechanical rigging to its braking position. Rail car tread brake systems also include a manually-operated hand brake in each rail car that shifts its mechanical rigging to the braking position. The hand brakes are applied when the train is "parked" for preventing the rail cars from moving while not coupled with a locomotive for a time. The hand brakes are then manually released when the locomotive is once again coupled and the brake systems recharged so that the brake systems in the rail cars are once again controlled by their pneumatic brake cylinders.

WO 2019/202032 A1 describes a rail car brake system having a monitoring system comprising a sensing module for measuring a dislocation of different parts of a brake regulator device relative to one another. The monitoring module comprises a battery or an energy harvesting power module. However, the known monitoring system has a high power consumption. Because of this, the monitoring system using a battery is not sufficiently reliable between normal maintenance intervals which may lie several months or even years apart. The use of an energy harvesting power module has been shown to be disadvantageous because of the risk of errors in the power supply and also because retrofitting large numbers of unpowered cargo wagons with energy harvesting components is economically unreasonable.

SUMMARY

Disclosed embodiments provide a tread brake assembly, in particular, for an unpowered tank or cargo wagon, that solves the disadvantages of the prior art, in particular, to provide a tread brake assembly with a sensor for reliably monitoring for extended periods of time in a particularly energy-efficient manner, with a limited local power supply, such as a battery, or with a cost-efficient energy harvesting component.

BRIEF DESCRIPTION OF FIGURES

In the following, particular embodiments are described in more details the reference to the figures.

For ease of intelligibility, the same or similar components are designated with the same or similar reference numerals in the following description of illustrations showing the disclosed embodiments.

DETAILED DESCRIPTION

Figure 1:
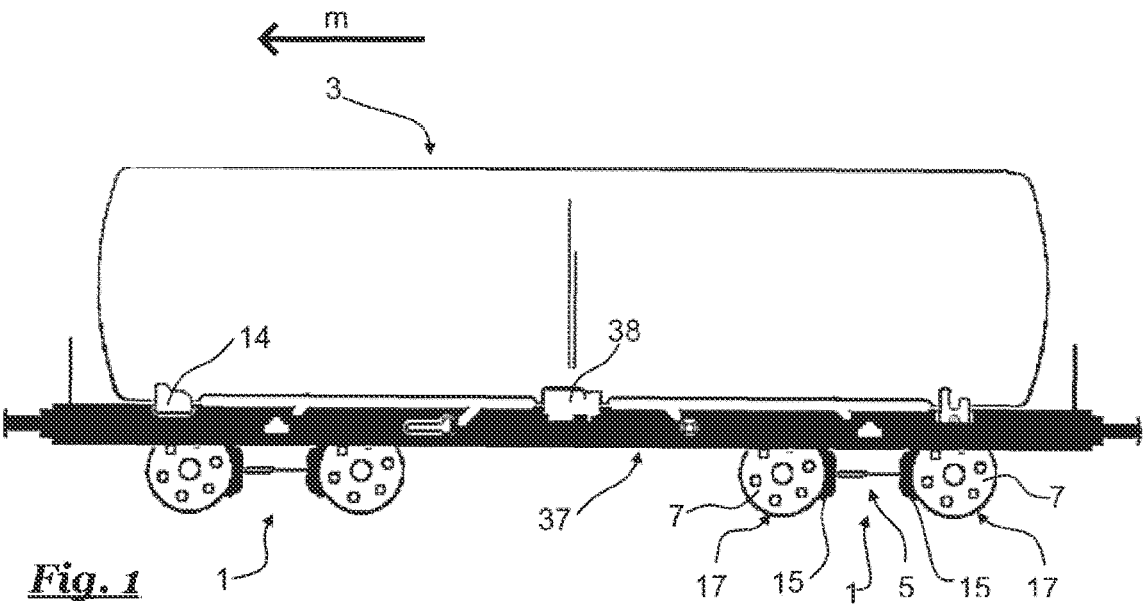
FIG. 1 shows a schematic illustration of a cargo wagon with tread brake assembly according to the disclosed embodiments.

A tread brake assembly for a rail car is provided, in particular, for an unpowered trail car, optionally a tank wagon or a cargo wagon. A cargo wagon may be an unpowered cargo wagon, and the monitoring system is optionally mounted entirely on an unpowered cargo wagon. The tread brake assembly includes at least one brake block for pressing against a tread of a corresponding rail car wheel, optionally at least one pair of tread brake blocks each for pressing against a respective rail car wheel tread of a first or leading and a second or trailing wheel. The tread brake assembly may include two pairs of brake blocks, in particular, a right pail and a left pair, for pressing against a respective rail car wheel tread. The brake assembly further includes an actuator, optionally at pneumatic or hydraulic actuator, for driving the brake element, and a rigging for transferring a braking force from the actuator to the brake element. The rigging is optionally a part of the linkage which may comprise moveable components and stationary components with respect to the railroad car chassis. The rigging optionally consists of moveably components, in particular, of the moveably linkage components. The brake assembly is actuated by the actuator. In particular, the actuator comprises a brake cylinder and a piston. The actuation is based on compressed air for a pneumatic actuator. Alternatively, the assembly includes a hydraulic actuator using a hydraulic actuating fluid, such as oil, to provide pressure for the hydraulic actuator.

The tread brake assembly also includes at least one sensor device for measuring at least one parameter of the brake assembly. A parameter of the brake assembly may include but is not limited to a parameter related to brake wear. Additionally or alternatively, a parameter of the brake assembly may be related to the flow and/or pressure of the hydraulic or pneumatic actuating fluid of the actuator. The brake assembly may include one or more further sensor devices for measuring one or more other parameters of the brake assembly, wherein the further sensor devices may include an accelerometer, a temperature sensor, a moisture sensor or the like.

According to the disclosed embodiments, the brake assembly further includes a stroke detector. The stroke detector is configured to enter its active state upon detecting a force, stress, strain or motion of the bracke block, the rigging or the actuator. The stroke detector unit activates the sensor device in the active state. In particular, the stroke detector may be configured to enter an active state when a braking action occurs. Optionally, the stroke detector is configured such that it senses a change of a stroking force and/or stroking movement of the actuator, the rigging attached thereto, and/or of one or more braking elements attached to the rigging. The stroke detector may be structurally designed such that it enters its active state after a minimal threshold of movement of one or more of the moving components of tread brake assembly, in particular, the rigging, occurs. Alternatively or additionally, the stroke detector may be designed such that it enters its active state when a minimal threshold force, minimal threshold deformation and/or minimal threshold stress acting at the actuator, at a predetermined point in the rigging and/or at least one a braking element is reached. Optionally, the stroke detector senses a braking action at the beginning thereof so that it can activate or turn on the sensor device such that the sensor device is capable to perform one or more measurements of one or more parameters during the braking action. The sensor device may optionally be triggered by the stroke detector such that one or more measurements of one or more parameters of the brake assembly can be taken while a maximal braking force acts and/or a maximal dislocation of the braking elements during the braking action occurs. In particular, the stroke detector may have a passive state (off) in which the stroke detector leaves the sensor device idle or turns the sensor device off.

In one embodiment, the stroke detector is connected to, optionally attached to, the brake linkage, in particular, the brake rigging. Optionally, the stroke detector is firmly attached to a movable or stationary component of the linkage. The rigging designates the moveably components of the linkage. By providing the stroke detector directly to the linkage, any movement, deformation, force and/or stress acting upon the linkage can directly be detected by the stroke detector.

In another embodiment that may be combined with one of the aforementioned, the rigging includes at least one brake regulator device for adjusting the rigging in accordance with a wear level of the at least one brake element, wherein in particular, the trigger is connected to the rigging, in particular, attached to the rigging or arranged on the rigging or brake regulator device, between the brake regulator device and the actuator. By arranging the stroke detector close to the actuator, the stroke detector can easily detect a trigger event initiated by the actuator causing the stroke detector to be activated. In this document, the term brake regulator device refers to a device for automatic adjustment of the clearance between brake elements and wheels. A brake slack adjuster is an example of such a brake regulator device. The brake regulator device forms the bridge between the wear-resistant brake elements, optionally brake blocks, and the actuator and the overall mechanical control of the brake. The brake regulator device contributes to the correct operation of the brake by absorbing the wear level of the brake elements, so that an equal force coming from the mechanical control results in a corresponding braking effect on the impact surface relating to the wheels, irrespective of the wear level of the brake elements. Characteristic hereby is that the brake regulator comprises a first part at one end and a second part at the other end which move further apart as the brake elements exhibit more wear. Optionally, the first part and second part mate in a sliding fit, more optionally a telescopic sliding fit.

In a further development of the tread brake assembly, the stroke detector is attached to the brake regulator device. Both the sensor device and the stroke detector may be attached to the brake regulator device. Thereby it can be achieved that the stroke detector is situated very close to the sensor device which it activates in the active state, wherein the sensor device may optionally be a sensor device for measuring a parameter related to the brake regulator device, such as a set distance dependent upon the current state of wear of one or more of the brake elements.

Alternatively or additionally, in one embodiment of a tread brake assembly, the brake regulator device is attached to the piston actuator. In particular, the tread brake assembly comprises no more than one brake regulator device. In an embodiment comprising only one brake regulator device, the regulator device may optionally be attached directly to the piston actuator, wherein the assembly optionally contains only one position actuator. Alternatively, the tread brake assembly may comprise two or more brake regulator devices, one, some or all of which may be provided with a respective sensor device.

According to one further development, the tread brake assembly includes at least one first brake block for engaging the tread of a rail wheel attached to a first axle, optionally a leading axle; and at least one second brake block for engaging the tread of a rail wheel attached to a second axle, optionally a trailing axle; wherein the brake rigging includes moveable components, such as a beam, rod and/or lever, connecting the actuator piston to the first and second brake block; and wherein the brake rigging includes at least one brake regulator device arranged between the first optionally leading and second optionally trailing brake block.

In a particular embodiment of the brake assembly, the stroke detector is configured to enter its active state upon detecting displacement of a component of the brake rigging in relation to a second component of the brake assembly, such as a stationary component of the linkage, another moveable rigging component, or in relation to the piston actuator. The displacement may for example be detected by the stroke detector by a mechanical switch which causes a change its switching state once a predetermined displacement threshold is overcome by a particularly movable linkage component. In addition or as an alternative, the stroke detector may be configured to enter its active state upon detecting displacement, force, stress or strain of a first component of the rigging in relation to a stationary component of the rail car, such as the rail car chassis or a stationary rigging bearing.

In one embodiment of a tread brake assembly that may be combined with the aforementioned, the sensor device includes a brake rigging position sensor in particular, for determining a position of a first component of the brake rigging in relation to a second component of the brake rigging. The rigging position sensor may for example measure a, particularly translational or rotational, position of a first rod, beam, lever, in relation to a second rod, beam or lever, wherein optionally the first and second component are directly linked to one another, for example via a joint or the brake regulator device.

According to a further development, the brake rigging position sensor measures the distance between two reference points of the brake regulator device, optionally reference points defined on at least one rod, optionally to rods, and/or the piston actuator.

According to one embodiment of the tread brake assembly, the brake rigging position sensor is only activated in the active state. The energy consumption of the sensor device can thereby be decreased substantially.

In one embodiment of a tread brake assembly that can be combined with the ones mentioned above, the sensor device includes a computing device and a data storage device, wherein the computing device is only activated in the active state and wherein the computing device is configured to calculate a parameter indicating brake state, such as brake wear, in particular, based on the measurement of the brake rigging position sensor and to cause the transmitter to send the parameter indicating the brake state. When monitoring the wear of a brake element it is important to also take the wear of the wheel into account. The change of the dislocation between the first and the second part does not depend only on the wear of the brake element, but also on the wear of the wheel. Certain events can create a notable change in wheel diameter, which in the past could not be accounted for by passive measurements, only by actual inspection. Such events are for instance high-intensity brake maneuvers. Especially in brake events where the wheel continues to slide along the rail in a locked position (so-called "wheel flat"), thereby chafing of part of its mantle at a fixed position, this warrants immediate regrinding of the wheel to a circular form, which of course severely impacts the diameter of the wheel. Another event is the routine maintenance, which comprises regrinding of the wheels, typically every 600 000 km or every 12 years, whichever comes first. When replacing worn brake elements with new brake elements, the aforementioned wear of the wheels must also be taken into account. The brake regulator must compensate for the altered mutual distance between the wear-resistant contact surface of the brake element and the wear-resistant surface of the wheel.

In a further development, the sensor device includes a piston actuator status sensor which is only activated in the active state. Additionally or alternatively, the piston actuator status sensor comprises an actuator position sensor for measuring a piston position. The piston position may relate to one or more of of the position of the piston in relation to a pneumatic or hydraulic chamber, a spring, a stationary bracked of the piston actuator, a moveable link for joining the piston actuator to the rigging.

Additionally or alternatively, in one embodiment of the tread brake assembly, the sensor device includes a wireless transmitter for sending at least one parameter of the tread brake assembly in particular, to a sensor hub of the rail car, wherein the wireless transmitter is only activated in the active state. The wireless transmitter may be a Bluetooth or a WiFi Transmitter.

In the following description of exemplary embodiments as shown in the figures, the tread brake assembly is generally designated with the reference numeral 1. The tread brake assembly 1 includes as its main constituents one or more brake blocks 15, an actuator 13 or 13' for driving the brake block(s) 15, the rigging 5, 5' for transferring a braking force from the actuator 13, 13' to the brake blocks 15, at least one sensor device 8, 8' and a stroke detector 9, 9'.

FIG. 1 shows a rail car 3 realized as an unpowered tank wagon equipped with a tread brake assembly 1 according to the disclosed embodiments. The tank wagon 3 is equipped with two sets of four rail car wheels 7. Each rail car wheel 7 may interact with a respective brake block 15 arranged facing the tread 17 of the rail car wheel 7. While the rail car 3 is moving, trailing behind a powered locomotive, the brakes are disengaged so that the brake blocks 15 do not engage the rail car wheel treads 17 so as not to impair the car's movement. When a braking action or stroke occurs, each brake block 15 is pushed against a corresponding tread 17 of the respective rail car wheel 7 so as to impart friction onto the surface of the tread 17 for slowing down the rail car 3.

Figure 2:
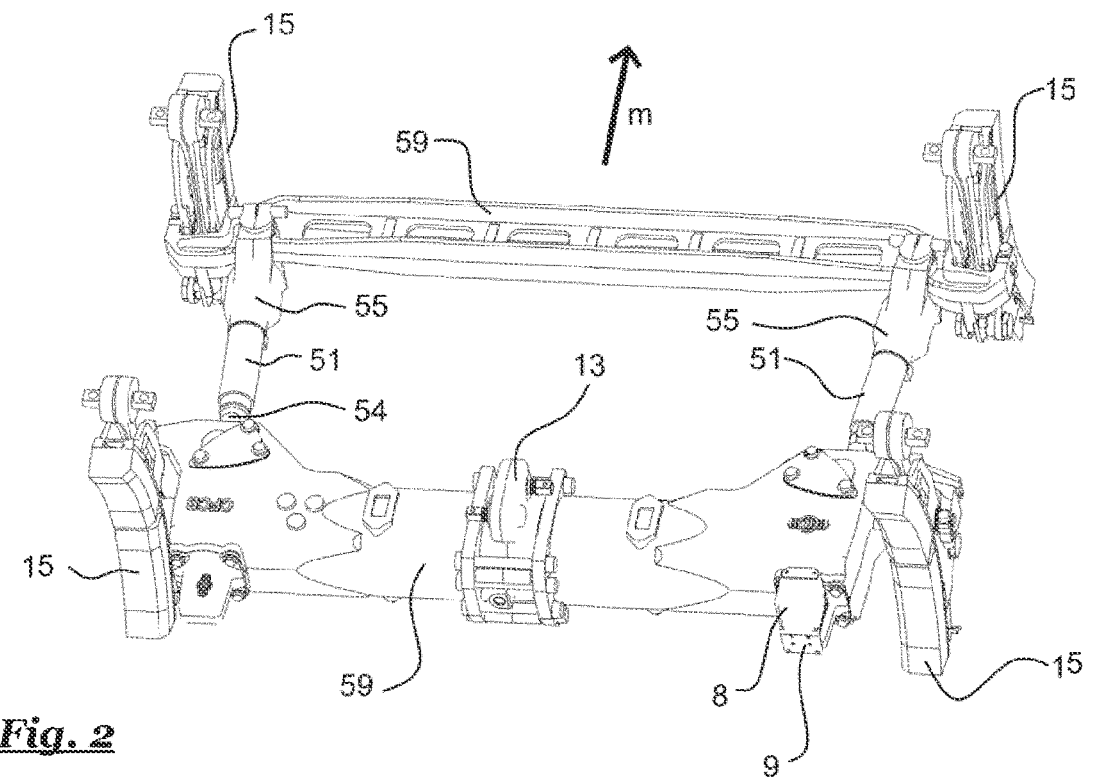
FIG. 2 shows a perspective view of a tread brake assembly according to a first embodiment.
Figures 3, 4:
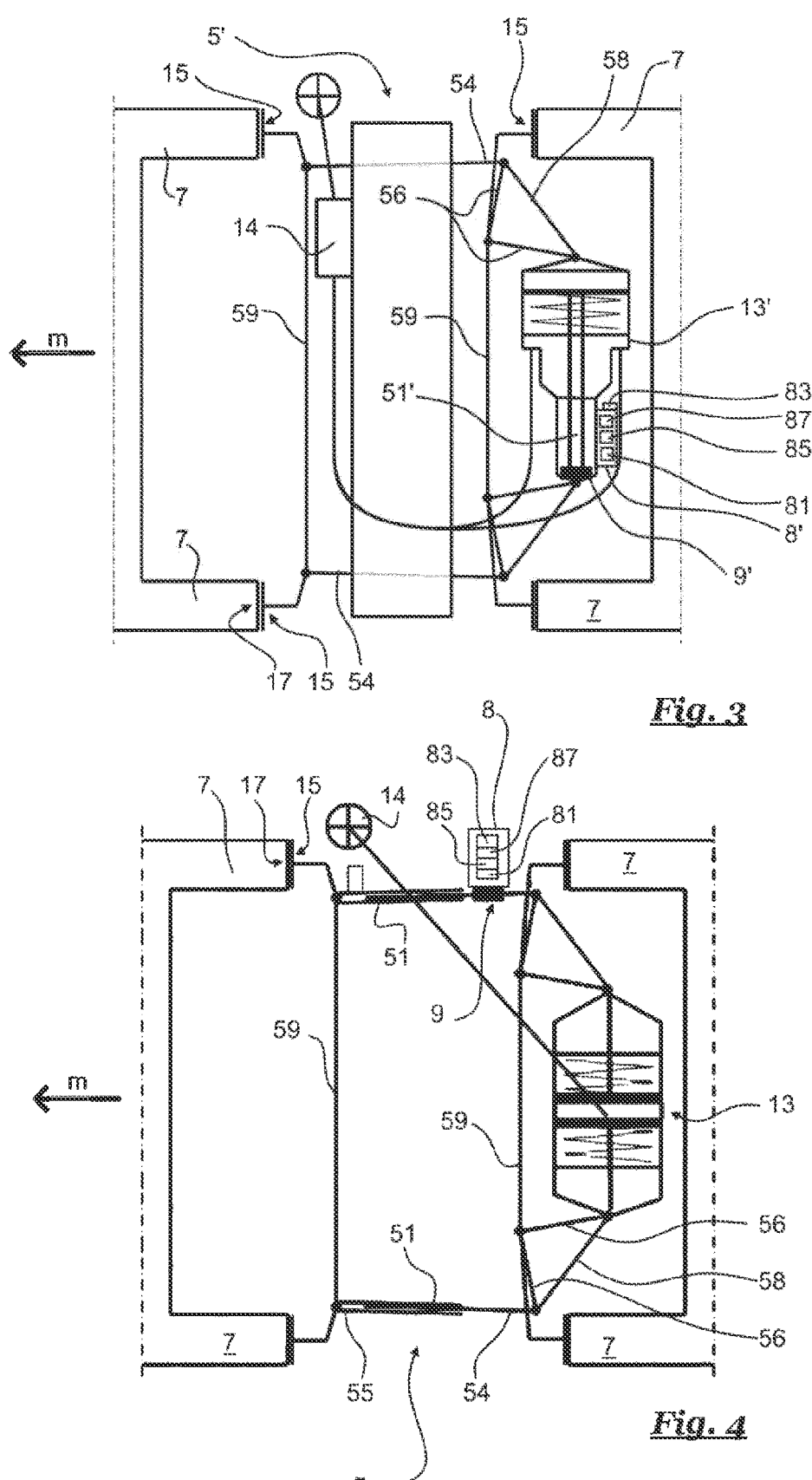
FIG. 3 shows a schematic illustration of the tread brake assembly according to a second embodiment with two pistons and regulator devices.
FIG. 4 shows a schematic illustration of a tread brake assembly according to the embodiment shown in FIG. 2.

A pneumatic cylinder actuator 13, 13' is provided on the rail car 3 which may be controlled to provide a mechanical force to the brake blocks 15 through the rigging 5. When pressure is entered into the cylinder actuator 13, 13', it may push against a brake lever 56 to enter a braking force from the actuator 13, 13' into the rigging 5. Pressure may be provided to the actuator by a pneumatic (or alternatively, in case the actuator is an hydraulic actuator) from a pressure source 14, such as a supply connection to a central railroad train pressure source, like a compressor on a powered rail car or locomotive. As illustrated in FIGS. 2, 3 and 4, the rigging 5 may comprise multiple moveable components including rods 54, 55, 59, levers 56 and beams 58. The brake rigging 5 is attached to the car 3 with stationary mounting sections. The mounting sections and other components stationary with respect to the rail car 3 which interact with the brake rigging 5 may be described as stationary components 37 of the linkage.

As shown in FIGS. 2-4, the rigging 5, 5' of the tread brake assembly 1 according to the disclosed embodiments includes one or more brake regulator device(s) 51, 51' realized as a so-called brake slack adjuster. The brake regulator device(s) 51, 51' form(s) one of the movable components of the brake rigging 5, 5' for transferring a braking force from the actuator 13 to the brake blocks 15. The brake regulator device 51, 51' may be configured to adjust the rigging 5 in accordance with a wear level of at least one brake block 15. Due to wear, the free distance between the brake blocks 15 and the corresponding tread 17 of the rail car wheel 7 increases, and the brake regulator device 51, 51' or brake slack adjuster can be configured to allow for the increase in free distance so that, regardless of the current state of wear of the brake block 15, a braking force provided by the actuator 13, 13' always results in the same braking effect on rail car wheels 7.

The rail car 3 may further be provided with one or more sensor devices 8, 8' capable and configured for measuring at least one parameter of the tread brake assembly 1. In the present embodiment, a particular sensor device 8, 8' including a position sensor 81' will be described in further detail below in reference to the different embodiments.

The sensor device 8 or 8', as shown in detail in FIG. 2, 3 or. 4, may comprise several components such as a computing device 85, a data storage device 87 and a transmitter 83. The computing device 85 may cooperate with the data storage device 87 to store measurement data collected from a sensor, such as the position sensor 81' or 81 and/or to store analysis functions. The computing device 85 may be configured to perform analysis functions on measurement data collected by the sensor in order to determine analysis data, particularly regarding brake wear.

The computing device 85 may further be configured to send and/or receive data via the transmitter 83. For example, the computing device 85 may be configured to send data related to measurement data and/or analysis a data via the transmitter 83. The transmitter 83 may comprise an antenna, such as a WiFi antenna or Bluetooth antenna. Data transmitted from the computing device 85 via the transmitter 83 may be received by a sensor hub 38 of the rail car 3.

The computer device 83 may transmit measurement data of a sensor device 8, 8' to the sensorhub 38 via the transmitter 83 so that wear of the brake blocks 15 can be calculated based on the measurement data. The measurement data and/or the corresponding brake wear can be transferred from the sensorhub 38 to a server via satellite transmission or radio transmission, where they may be stored for further evaluation. The sensorhub 38 may be connected to the pneumatic or hydraulic power supply 14. The sensorhub 38 may comprise an energy harvesting component for creating electrical energy from pneumatic or hydraulic energy, to supply the sensor hub 38, the brake assembly 1, particularly the sensor device 8, 8' thereof, and/or other components attached to the of the rail car 3 with electrical energy.

A sensor hub 38 of the rail car 3 may be provided on the rail car 3 and configured to communicate wire-bound or wireless with one or more sensor devices 8. A sensor hub 38 may further be provided with communication means to communicate with one or more remote systems, such as a cloud-based control and/or diagnosis system (not shown in detail).

The tread brake assembly 1 is provided with a stroke detector 9, 9' that has a passive state (off) and an active state (on). The stroke detector 9, 9' is configured to enter its active state for at least part of the duration of a braking stroke. The stroke detector 9, 9' is activated at the beginning of a stroke of the actuator 13 to wake up the sensor unit 8, 9' so that the sensor unit 8, 8' may start a measurement during a braking stroke, particularly when full braking occurs. In the active state, the stroke detector 9, 9' activates the sensor device 8, 8'. In the passive state, the stroke detector 9, 9' is configured not to activate the sensor device 8, 8'. The stroke detector 9, 9' may be configured to leave the sensor device 8, 8' idle in the passive state, or to actively cause the sensor device 8, 8' to enter an inactive state. In the present embodiment, the stroke detector 9, 9' is configured to leave the sensor device 8, 8' idle in the passive state of the stroke detector, so that in the passive state, the stroke detector 9, 9' does not affect whether the sensor unit 8, 8' remains activated, whether the sensor unit 8, 8' changes from active to inactive, or whether the sensor unit 8, 8' remains inactive. The computing device 83 may be configured to perform at least one of the following actions upon having been activated by the stroke detector 9, 9': (i) conduct one or more measurements with a sensor, (ii) perform one or more analysis functions based on the measurement(s), and/or (iii) send measurement data and/or analysis data via the transmitter 83.

In the present embodiments, the sensor device 8, 8' may be configured to turn itself inactive, for example enter a sleep mode or an off mode, after a predetermined time and/or after having performed one or more predetermined actions. The computing device 83 may be configured to turn the sensor device 8, 8' inactive again after performing at least one of the above-mentioned actions (i), (ii), and/or (iii). Alternatively or additionally, the computing device 83 may be configured to run a timer for a predetermined amount of time, such as 20 seconds, before turning the sensor device 8 inactive again.

As shown in FIGS. 2 and 3, the rigging 5, 5' comprises a brake regulator device 51, 51' with a longitudinal movability attached to two brake rigging rods 54, 55 which may move translationally with respect to one another for setting the regulator device 51, 51'. In any given setting of the regulator device, 51, the first and second rod 54, 55 thereof are firmly connected to each other. The first brake rigging rod 54 is coupled to a brake rigging lever 56 attached to the actuator 13. The first brake rigging rod 54 is slidably engaged by a bearing 37 stationary with respect to the wagon 3. The second rigging rod 55 is attached to the brake rigging 5 including beams 58, rods 59 and levers 56 for transferring a braking force from the brake regulator device(s) 51, 51' to the brake blocks 15.

In the embodiments shown in FIGS. 2 and 3, the pneumatic actuator 13, 13' has a single pneumatic actuation chamber acting against two mutually opposite, spring-biased pistons. Each piston provides a braking force onto a respective pair of brake blocks 15 opposite to one another in the driving direction m of the cargo wagon (leading wheel or trailing wheel) on either the right or the left side of the wagon 3, with respect to a main direction m of movement of the wagon. The pistons of the actuator 13, 13', the regulator devices 51, 51', some components of the brake rigging 5, 5', the brake blocks 15, and the corresponding wheel 7 treads 17 can accordingly be designated as either "left" or "right". Linkage cross rods 59, 59' connect the left and right sections of the brake rigging 5, 5'.

In the embodiment shown in FIG. 2, the sensor device 8 and the stroke detector 9 are arranged on the brake rigging 5 on the right-hand side. Both the sensor device eight and the stroke detector 9 are attached to movable components of the rigging 5, which may in particular, be realized at a joint connecting the brake rigging beam 58 and the first brake rigging rod 54 arranged between the actuator 13 and the right slack adjuster 51. Alternatively, it should be clear that either one or both of the sensor device 8 and the stroke detector 9 could be attached to a stationary component of the rigging 5, such as a rail car 3 chassis section 37. According to another conceivable alternative, either one or both of the sensor device 8 and the stroke detector 9 could be attached on one side to the actuator 13 and on the other side to a movable component of the rigging 5.

In the embodiment shown in FIG. 3, the sensor device 8' and the stroke detector 9' are attached to the right hand side brake regulator device 51'. The stroke detector 9' is firmly attached to the first rod 54 of the right hand side regulator device 51'. The stroke detector 9' is configured to detect any relative movement of the first brake rigging rod 54 relative to the regulator device 51'. When the relative movement of the first brake rigging rod 54 relative to the regulator device 51' occurs, the stroke detector 9' enters its active state. In the active state, the stroke detector 9' activates the sensor unit 8'.

In both embodiments according to FIG. 2 or 3, the respective sensor device 8 or 8' and the respective stroke detector 9 or 9' are arranged on a laterally outward section of the tread brake assembly 1, 1' so that maintenance personnel can easily access, attach and/or disassemble stroke detector and/or sensor device, for example for replacing a battery. It may further be advantageous to directly attach the sensor device to the stroke detector or at least to arrange the stroke detector in close proximity to the sensor device which it activates, for example for safety reasons. The sensor device and the stroke detector may be preassembled as a unit so that they can be easily be replaced or retrofitted, thereby significantly decreasing the necessary manual labor The sensor unit 8' shown in detail in FIG. 3 includes a position sensor 81. The position sensor 81 is configured to detect the current setting of the brake regulator device 51'. In the shown embodiment, a brake slack adjuster 51' position sensor 81' is coupled to the first rigging rod 54. The adjuster position sensor 81' is realized as an optical sensor. The optical position sensor 81' cooperates with a reflector to measure a distance between the optical emitter of the sensor 81' and the reflector corresponding to a current state of the slack adjuster 51'.

For example, at the end of the braking cycle and/or when the braking force reaches a maximum, the sensor unit 8' may make a measurement with the distance sensor 81' to determine the distance from reference sections of the slack adjuster 51', particular from reference sections rigidly attached to the first or second brake rigging rod 54, 55 moveable in relation to one another.

FIG. 4 shows a schematic illustration of a tread brake assembly 1 as shown in FIG. 2 with a spring-biased single piston actuator 13 having the sensor device 8 and the stroke detector 9 directly attached to the actuator 13. The brake rigging regulator 51 is also directly coupled to the actuator 13. Sensor device 8 and/or stroke detector 9 may be directly coupled to a piston rod of the piston actuator which also serves as an input rod of the brake regulator device 51. Sensor device 8 and/or stroke detector 9 may be attached between the unit consisting of actuator 13 and brake regulator device 51 and the rigging 5, in particular, a brake rigging beam 58. The sensor device 8 may for instance be a ultrasonic position or distance sensor 81. The detector 9 may include an electromechanical switch, such as a microswitch, and/or a sensor, such as a piezo-element or strain-gauge, for detecting a braking force and/or stress or strain caused by a braking force onto the components of the rigging 5.

LIST OF REFERENCE NUMERALS

1 tread brake assembly
3 rail car
5, 5' brake rigging
7 rail car wheel
8, 8' sensor device
9, 9' stroke detector
13 actuator
14 pressure source
15 brake block
17 tread
37 stationary component
38 sensor hub
51, 51' brake regulator device
54, 55, 59 brake rod
56 brake lever
58 brake beam
81, 81' position sensor
83 transmitter
85 computing device
87 data storage device

The invention claimed is:

1. A tread brake assembly for a rail car, the tread brake assembly comprising:

at least one brake block for pressing against a tread of a corresponding rail car wheel;

a piston actuator powered by a fluid for driving the tread brake assembly;

a brake rigging for transferring a braking stroke from the actuator piston to the at least one brake block;

at least one sensor device for measuring at least one parameter of the tread brake assembly; and a stroke detector having an active state in which the stroke detector activates the sensor device, wherein the stroke detector is configured to enter its active state upon detecting a force, stress, strain or motion of the brake block, the brake rigging and/or the actuator.

2. The tread brake assembly of claim 1, wherein the stroke detector is connected to the brake linkage, in particular the brake rigging.

3. The tread brake assembly of claim 1, wherein the brake rigging includes at least one brake regulator device for adjusting the brake rigging in accordance with a wear level of the at least one brake block.

4. The tread brake assembly of claim 3, wherein the stroke detector is attached to the brake regulator device.

5. The tread brake assembly of claim 3, wherein the brake regulator device is attached to the piston actuator wherein the tread brake assembly comprises no more than one brake regulator device.

6. The tread brake assembly of claim 3, wherein the tread brake assembly includes at least one first brake block for engaging the tread of a rail wheel attached to a first axle; and at least one second brake block for engaging the tread of a rail wheel attached to a second axle, wherein the brake rigging includes moveable components, connecting the actuator piston to the first and second brake block, and wherein the brake rigging includes at least one brake regulator device arranged between the first and second brake block.

7. The tread brake assembly of claim 1, wherein the stroke detector is configured to enter its active state upon detecting displacement of a component of the brake rigging in relation to a second component of the brake assembly or in relation to the piston actuator.

8. The tread brake assembly of claim 1, wherein the sensor device includes a brake rigging position sensor for determining a position of a first component of the brake rigging in relation to a second component of the brake rigging.

9. The tread brake assembly of claim 8, wherein the brake rigging position sensor measures the distance between two reference points of the brake regulator device.

10. The tread brake assembly of claim 8, wherein the brake rigging position sensor is only activated in the active state.

11. The tread brake assembly of claim 8, wherein the sensor device includes a computing device and a data storage device, wherein the computing device only activated in the active state and wherein the computing device is configured to calculate a parameter indicating brake state, such as brake wear, in particular based on the measurement of the brake rigging position sensor and to cause the transmitter to send the parameter indicating the brake state.

12. The tread brake assembly of claim 1, wherein the sensor device includes a piston actuator status sensor which is only activated in the active state.

13. The tread brake assembly of claim 12, wherein the piston actuator status sensor comprises an actuator position sensor for measuring a piston position.

14. The tread brake assembly of claim 1, wherein the sensor device includes a wireless transmitter for sending at least one parameter of the tread brake assembly in particular to a sensor hub of the rail car, wherein the wireless transmitter is only activated in the active state.

15. The tread brake assembly of claim 6, wherein the moveable components of the brake rigging include a beam, rod and/or lever connecting the actuator piston to the first and second brake block.

\* \* \* \* \*